(12) United States Patent
Abed et al.

(10) Patent No.: US 10,169,361 B2
(45) Date of Patent: Jan. 1, 2019

(54) COLUMNAR DATABASE COMPRESSION

(71) Applicant: International Business Machines Corporation, Armonk, NY (US)

(72) Inventors: Sami Abed, Rathfarnham (IE); Pedro M Barbas, Dunboyne (IE); Austin Clifford, Glenageary (IE); Konrad Emanowicz, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 14/942,772

(22) Filed: Nov. 16, 2015

(65) Prior Publication Data
US 2017/0139947 A1 May 18, 2017

(51) Int. Cl.
*G06F 17/30* (2006.01)
*G06N 99/00* (2010.01)

(52) U.S. Cl.
CPC .... *G06F 17/30153* (2013.01); *G06F 17/3053* (2013.01); *G06F 17/30315* (2013.01); *G06F 17/30584* (2013.01); *G06N 99/005* (2013.01)

(58) Field of Classification Search
CPC .......... G06F 17/30153; G06F 17/3053; G06F 17/30315; G06F 17/30584; G06N 99/005; G06N 5/04
(Continued)

(56) References Cited
U.S. PATENT DOCUMENTS 5,253,325 A 10/1993 Clark
7,398,276 B2 7/2008 Kirovski et al.
(Continued)

FOREIGN PATENT DOCUMENTS

CA 2613692 A1 6/2009

OTHER PUBLICATIONS

Ingo Muller, Adaptive String Dictionary Compression in In-Memory Column-Store Database Systems, Aug. 2015.
(Continued)

*Primary Examiner* — Greta L Robinson
(74) *Attorney, Agent, or Firm* — Edward J. Wixted, III

(57) ABSTRACT

Disclosed is a computer-implemented method of compressing data in a columnar database comprising at least one column partitioned into a plurality of partitions including at least one empty partition and a plurality of filled partitions each comprising data entries associated with a set of parameters having parameter values relevant to the recurrence frequency of the data entry in the partition, the data entries being compressed in accordance with a compression dictionary based on the respective recurrence frequencies of the data entries in the filled partition. The computer-implemented method comprises receiving forecasted parameter values for the set of parameters for an expected set of data entries to be stored in an empty partition of the column; predicting a recurrence frequency of the data entries in the expected set using the forecasted parameter values by evaluating the respective compression dictionaries of the filled partitions with a machine learning algorithm; generating a predictive compression dictionary for the expected set of data entries based on the predicted recurrence frequency of the data entries in the expected set; receiving the expected set of data entries; and compressing at least part of the received expected set of data entries using the predictive compression dictionary. A computer program product and a computer system for implementing such a method are also disclosed.

15 Claims, 3 Drawing Sheets

(58) Field of Classification Search
USPC .......................................... 707/693, 812, 825
See application file for complete search history.

(56) References Cited

U.S. PATENT DOCUMENTS

| | | | | |
|---|---|---|---|---|
| 8,583,692 | B2* | 11/2013 | Ganesh | G06F 17/30595 |
| | | | | 707/693 |
| 8,645,337 | B2* | 2/2014 | Kapoor | G06F 17/30501 |
| | | | | 707/693 |
| 8,768,899 | B2 | 7/2014 | Faerber et al. | |
| 8,933,829 | B2 | 1/2015 | Beier et al. | |
| 9,426,219 | B1* | 8/2016 | Keyser | H04L 67/1097 |
| 9,892,150 | B2* | 2/2018 | Jayanth | G06F 17/30345 |
| 2008/0281784 | A1* | 11/2008 | Zane | G06F 17/30463 |
| 2010/0250605 | A1 | 9/2010 | Pamu et al. | |
| 2012/0117064 | A1 | 5/2012 | Draese et al. | |
| 2012/0221528 | A1* | 8/2012 | Renkes | G06F 17/30315 |
| | | | | 707/674 |
| 2013/0073530 | A1 | 3/2013 | Faerber et al. | |
| 2013/0094340 | A1* | 4/2013 | Earhart | G11B 20/1217 |
| | | | | 369/103 |
| 2015/0088824 | A1* | 3/2015 | Kamp | G06F 15/78 |
| | | | | 707/626 |
| 2015/0178305 | A1* | 6/2015 | Mueller | G06F 17/30129 |
| | | | | 707/693 |

OTHER PUBLICATIONS

Miklos Ajtai Compactly encoding unstructured inputs with differential compression, 2002.
Goetz Graefe, Data Compression and Database Performance, Apr. 1991.
Balakrishna Iyer, Data Compression Support in Databases, 1994.

* cited by examiner

COLUMNAR DATABASE COMPRESSION

BACKGROUND

Embodiments of the present invention are concerned with providing a computer-implemented method, a computer program product and a computer system that facilitate efficient data compression and subsequent data storage in a columnar database.

In modern relational database management systems, data is typically stored in compressed form in order to optimize the use of the available storage space, i.e. maximize the volume of data that can be stored in the database. To this end, well-known compression or encoding algorithms such as Lempel-Ziv, Huffman, LZ77, LZ78 algorithms and so on are used to compress (encode) the data to be stored in the database.

The factor by which the uncompressed data is compressed is sometimes referred to as the compression ratio of the data. A higher compression ratio corresponds to a more effective compression of the data. Therefore, it is desirable to maximize the compression ratio of the data when compressing the data for storage into the database.

Data compression is typically achieved by building a compression dictionary for the data, in which particular data strings are represented by particular bit patterns. In order to achieve a high compression ratio, short bit patterns are typically assigned to frequently recurring data strings in the data, with longer bit patterns used for less frequently recurring data strings in the data. This commonly requires evaluation of the full dataset to be stored in the database in order to determine the recurrence frequency of the various data strings, e.g. data entries, in the dataset. This can be a time-consuming exercise, which can account for up to 40% of the overall load process of the data into the database. Such large overhead can be undesirable, for example from a performance perspective.

SUMMARY

According to an aspect, there is provided a computer-implemented method of compressing data in a columnar database comprising at least one column partitioned into a plurality of partitions including at least one empty partition and a plurality of filled partitions each comprising data entries associated with a set of parameters having parameter values relevant to the recurrence frequency of the data entry in the partition, the data entries being compressed in accordance with a compression dictionary based on the respective recurrence frequencies of the data entries in the filled partition, the computer-implemented method comprising receiving forecasted parameter values for the set of parameters for an expected set of data entries to be stored in an empty partition of the column; predicting a recurrence frequency of the data entries in the expected set using the forecasted parameter values by evaluating data entry ranking histories associated with the respective compression dictionaries of the filled partitions with a machine learning algorithm; generating a predictive compression dictionary for the expected set of data entries based on the predicted recurrence frequency of the data entries in the expected set; receiving the expected set of data entries; and compressing at least part of the received expected set of data entries using the predictive compression dictionary.

According to another aspect, there is provided a computer program product comprising a computer readable storage medium having computer readable program instructions embodied therewith for, when executed on a computer system for managing a columnar database comprising at least one column partitioned into a plurality of partitions including at least one empty partition and a plurality of filled partitions each comprising data entries associated with a set of parameters having parameter values relevant to the recurrence frequency of the data entry in the partition, the data entries being compressed in accordance with a compression dictionary based on the respective recurrence frequencies of the data entries in the filled partition and comprising a processor arrangement adapted to execute the computer readable program instructions, cause the processor arrangement to receive forecasted parameter values for the set of parameters for an expected set of data entries to be stored in an empty partition of the column; predict a recurrence frequency of the data entries in the expected set using the forecasted parameter values by evaluating data entry ranking histories associated with the respective compression dictionaries of the filled partitions with a machine learning algorithm; generate a predictive compression dictionary for the expected set of data entries based on the predicted recurrence frequency of the data entries in the expected set; receive the expected set of data entries; and compress at least part of the received expected set of data entries using the predictive compression dictionary.

According to yet another aspect, there is provided a computer system comprising a processor arrangement for managing a columnar database comprising at least one column partitioned into a plurality of partitions including at least one empty partition and a plurality of filled partitions each comprising data entries associated with a set of parameters having parameter values relevant to the recurrence frequency of the data entry in the partition, the data entries being compressed in accordance with a compression dictionary based on the respective recurrence frequencies of the data entries in the filled partition, the processor arrangement being adapted to receive forecasted parameter values for the set of parameters for an expected set of data entries to be stored in an empty partition of the column; predict a recurrence frequency of the data entries in the expected set using the forecasted parameter values by evaluating data entry ranking histories associated with the respective compression dictionaries of the filled partitions with a machine learning algorithm; generate a predictive compression dictionary for the expected set of data entries based on the predicted recurrence frequency of the data entries in the expected set; receive the expected set of data entries; and compress at least part of the received expected set of data entries using the predictive compression dictionary.

BRIEF DESCRIPTION OF THE DRAWINGS

Preferred embodiments of the present invention will now be described, by way of example only, with reference to the following drawings, in which.

DETAILED DESCRIPTION

Figure 1:
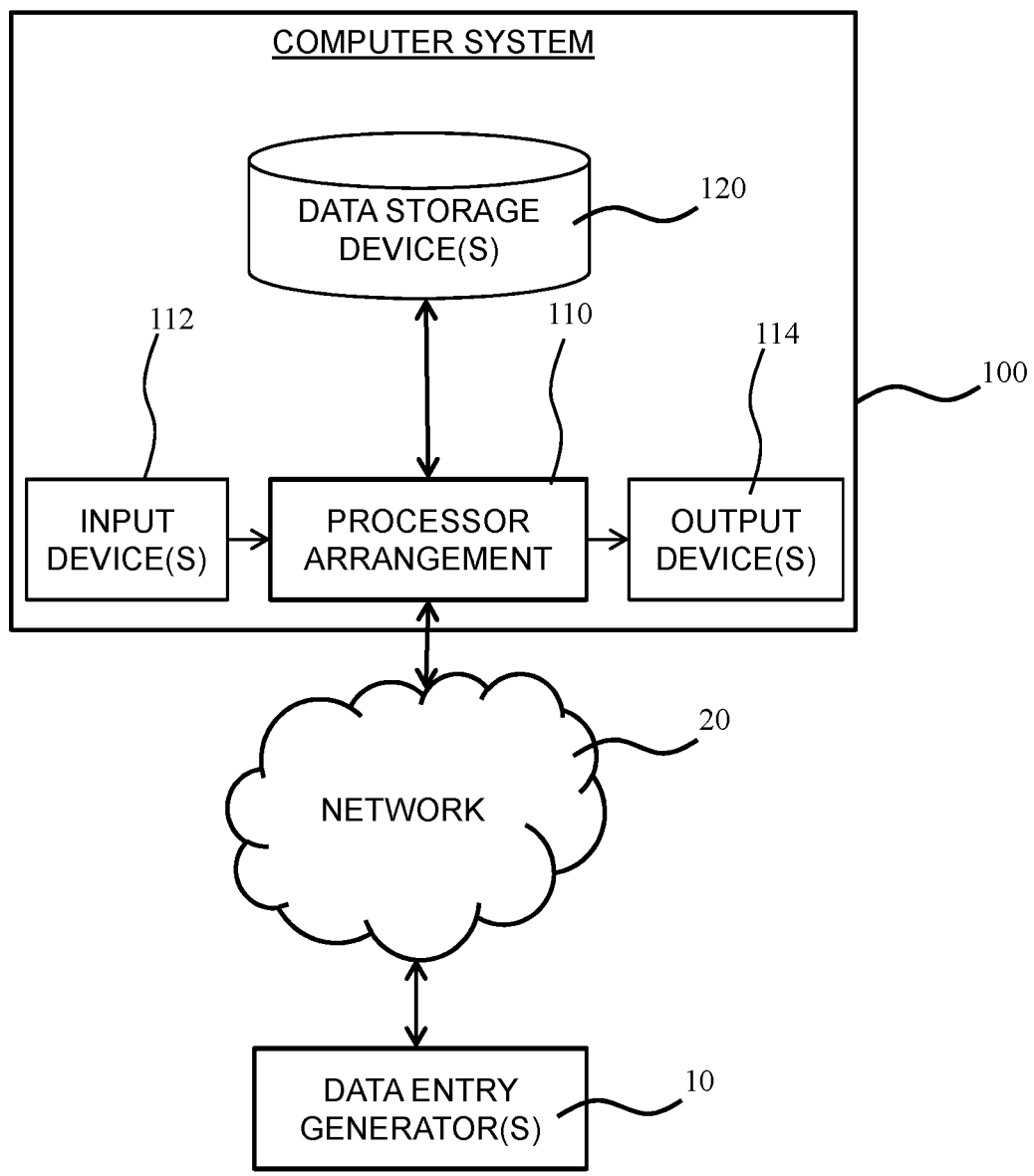
FIG. 1 schematically depicts a computer system according to an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

FIG. 1 schematically depicts a computer system 100 according to an embodiment. The computer system 100 according to an embodiment comprises a processor arrangement 110, which processor arrangement may comprise one or more processors arranged to cooperate with each other in any suitable manner in order to provide the processing functionality of the computer system 100. Any suitable type of processor may be used for the processor arrangement 110, such as for example single core processors, multi-core processors, application-specific integrated circuits, and so on.

The computer system 100 may further comprise one or more data storage devices 120 (here symbolized by a single device by way of non-limiting examples only), which data storage devices 120 may be any suitable data storage device such as a read-only memory, a random access memory, a Flash memory, a solid state disk or disk array, an optical disc or disk array, a magnetic disk or disk array, which some of the data storage devices being connected to the computer system 100 via a network or cable, e.g. in the case of network-attached storage, storage area networks, cloud storage, and so on. Any suitable combination of such well-known data storage devices 120 may form part of the computer system 100. Alternatively, at least part of the data storage device(s) 120 may be external to the computer system 100, in which case the computer system 100 may be communicatively coupled to the data storage device(s) 120 using a P2P connection, a wired or wireless network, and so on. Any suitable type of wired or wireless network may be used for this purpose.

The one or more data storage devices 120 may store a columnar database forming part of a column-oriented database management system (DBMS) that stores data tables as sections or petitions of columns of data. As is known per se, a column-oriented DBMS holds advantages for data warehouses, customer relationship management systems and other ad hoc enquiry systems where aggregates are computed over a large number of similar data items. In an embodiment, the columnar database may comprise a column of data entries that belong to a closed set of data entries (i.e. the set of data entries comprises a finite and known number of data entries), with each data entry being associated with a set of parameter values, which values exhibit a degree of correlation with the recurrence frequency of the data entries in the particular partition of the database column in which the data entries are stored. This will be explained in more detail below. The respective parameter values may be stored in respective columns of the columnar database, for example such that a 'row' of this database comprises column entries including a data entry and its associated parameter values. The data table of the database including such columns may be partitioned into a plurality of partitions, each partition comprising a plurality of such 'rows', i.e. a plurality of column entries into which fresh data may be stored. Consequently, during use the database typically comprises partitions previously filled with data entries (and parameter values), which data entries may be compressed using a particular compression library, as well as empty partitions for storing expected data entries.

The computer system 100 may further comprise one or more input devices 112, e.g. a keyboard, mouse, voice recognition module, touchscreen, and so on and may further comprise one or more output devices 114, e.g. a display device such as a computer monitor, an audio output device, a printing device, and so on. The computer system 100 may take any suitable shape, for example may comprise one or more computers acting as servers, each computer may be individually one of a network server, an application server, or a blade server and so on. Two or more networked servers may share in the execution of at least portions of a same application, program, function, or other assemblage of programmable and executable code.

The computer system 100 may further be connected to one or more data entry generators 10 for the earlier mentioned database, in which each data entry generator may be any suitable computing device configured to generate such data entries, e.g. a portable desktop computer, a smart portable device such as a smart phone or tablet computer, a client server, and so on. The data entry generators 10 may communicate the data entries to the computer system 100 over a network 20, which may be any suitable network, e.g. wired networks such as a LAN or the Internet, wireless networks such as mobile communication networks, Wi-Fi networks, and so on. The processor arrangement 110 of the computer system 100 may be communicatively coupled to the network 20 via any suitable network interface (not shown) of the computer system 100.

The one or more data entry generators 10 may generate data entries for storage in the columnar database stored in the one or more data storage devices 120 forming part of or being accessible to the computer system 100. The computer system 100 may be adapted to collect the data entries generated by the one or more data entry generators 10 over a period of time, e.g. a defined period of time such as a day, week or any other suitable unit of time and to store the set of data entries collected during that time period into an empty partition of the columnar database. For example, the data entries may relate to a particular commercial transaction, such as the sale of a particular product, which may be a tangible product such as a grocery item or any other suitable tangible product, or an intangible product such as financial product. Such products typically form part of a finite set of products to be stored in the columnar database as previously explained. Consequently, each partition of the database contains data entries belonging to the same set of data entries. The one or more data entry generators 10 for example may be located in or associated with different outlets of a chain of outlets having a centrally managed product database although other scenarios of course will be immediately apparent to the skilled person.

Embodiments of the present invention are based on the insight that the sale of products may be influenced by external factors. For example, the sale of a particular financial product may depend on certain economic conditions such as stock exchange index value or value change, global or national economic sentiment, and so on. As another example, the sale of a particular food product such as chocolate may depend on external meteorological factors such as weather conditions, e.g. sunny or rainy weather, temperature and so on, on external temporal factors such as the days on which the product is discounted, closeness (in terms of a chosen time unit, e.g. days) to particular holidays such as Christmas or Easter, and so on. Similarly, the sale of a particular luxury product such as a games console or the like may depend on external factors such as closeness to particular holidays such as Christmas, days on which the product is discounted, economic conditions, and so on. In this manner, typical product sales of specific products can be related to various external conditions, which will also be referred to as parameters in the present application. In general, any suitable type of parameter affecting product sales, e.g. meteorological parameters, economic parameters and temporal parameters, or any other suitable type of parameter, may be contemplated. Such parameters may be provided in any suitable manner, e.g. by a user of the computer system 100, by automatic feeds, and so on.

The computer system 100 may maintain a parameter value history for the data entries previously stored in the columnar database, which history for example may include ranking information for a particular data entry indicative of the rank of the data entry in an associated compression dictionary used to compress the data entry prior to its storage in the columnar database. Such ranking information may comprise a list of data entries stored in a particular partition of the columnar database ordered or ranked in terms of recurrence frequency, i.e. the number of times a particular data entry appears in a dataset to be stored in a particular partition of the columnar database. Such ordering or ranking may be any suitable ordering or ranking, e.g. in terms of decreasing or increasing recurrence frequency of the respective data entries in the dataset. In at least some embodiments, the parameter value history may form part of the respective compression dictionaries used for the compression of the data entries in the various partitions of the columnar database, e.g. in the form of metadata to such dictionaries.

Such a parameter value history may facilitate the determination of a correlation between a particular ranking of a data entry in a dataset as a function of a particular set of parameter values, which correlation may be used to predict a ranking of a data entry in a data set to be received by the computer system 100 by the provision of a forecast or prediction of the parameter values (i.e. the external conditions) that influence the recurrence frequency of a particular data entry in the dataset as previously explained. To this end, the computer system 100 may employ a machine learning algorithm that receives forecasted parameter values for an expected set of data entries and evaluates the parameter value history associated with the respective compression dictionaries used to compress previously received data entries prior to storage of these previously received data entries in the columnar database in order to establish a correlation between the historical parameter values and a particular ranking of a data entry in the historical set of data entries compressed in accordance with an associated compression dictionary.

The thus established correlation(s) may be used by a machine learning algorithm to predict a ranking of the various data entries in the data set to be received (i.e. the expected set of data entries), for example by identifying historical parameter values that most closely resemble the forecasted parameter values and using the historical ranking information associated with the historical parameter values to predict the ranking of the expected data entries to be received. This predicted ranking may be used to form a predictive compression dictionary in which the degree of compression of the various data entries is based on their predicted ranking, thus avoiding the need to evaluate the entire expected set of data entries when receiving this set.

Figure 2:
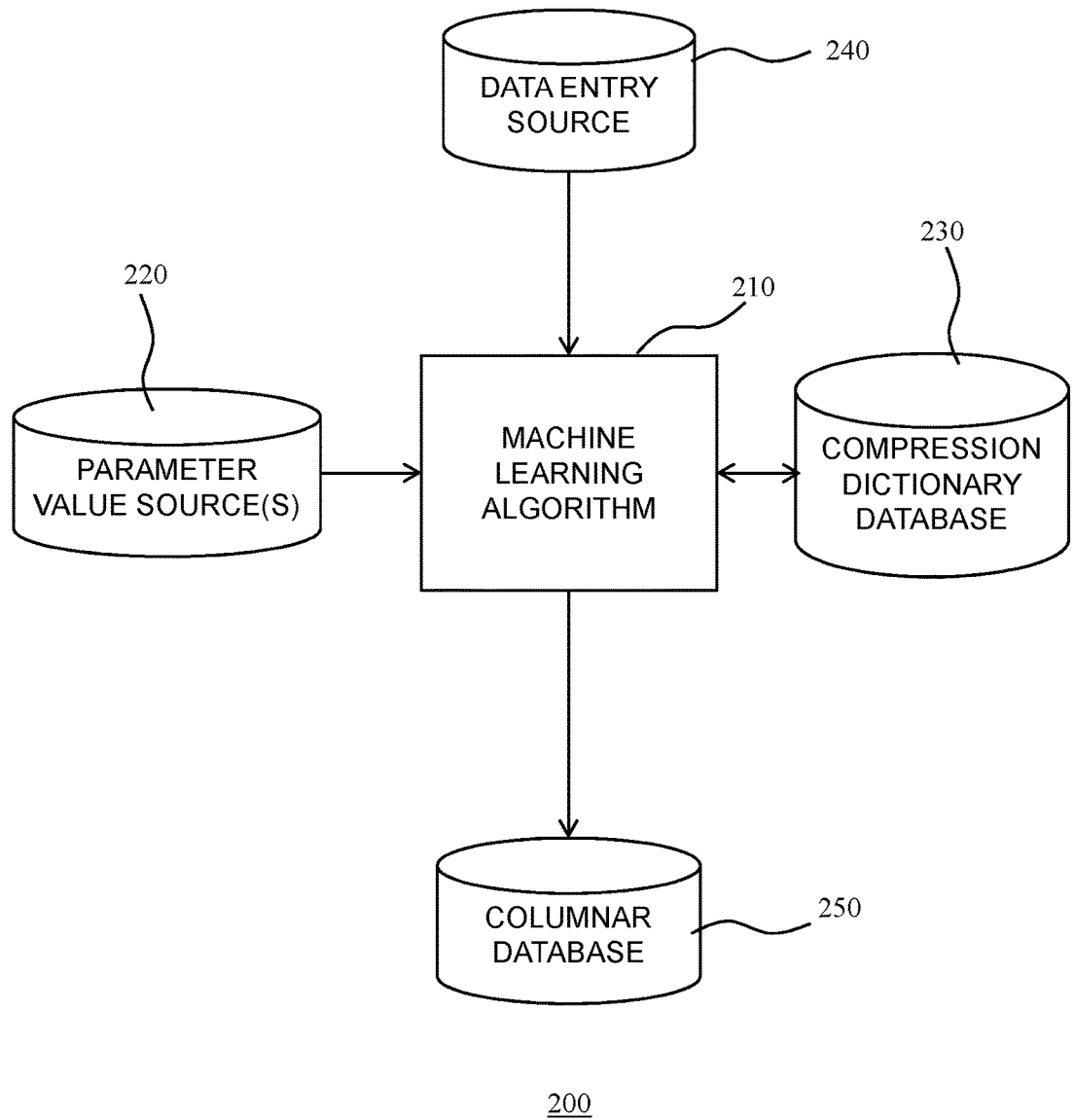
FIG. 2 schematically depicts a relational database management system implemented by a computer system according to an embodiment.
Figure 3:
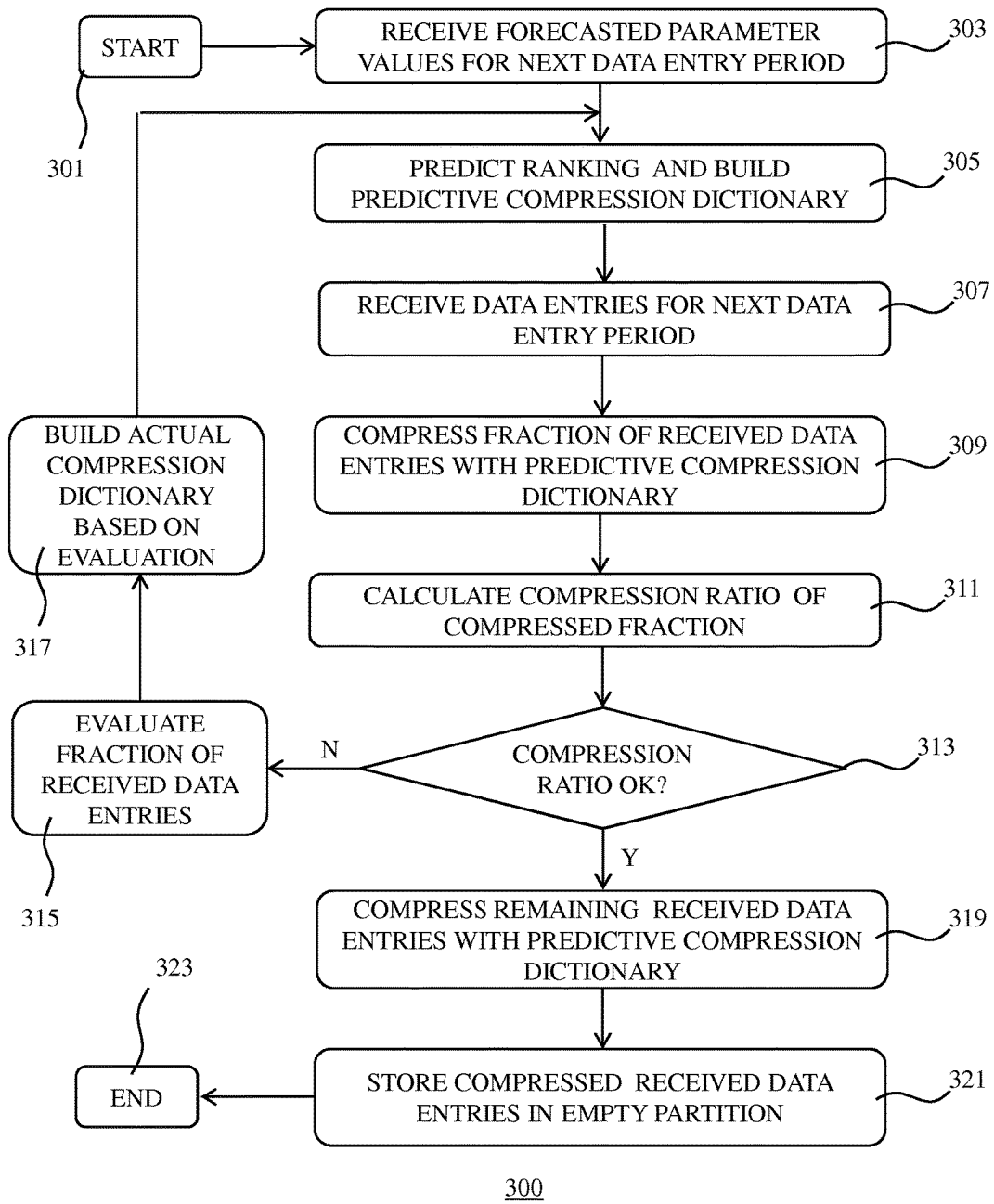
FIG. 3 schematically depicts a flowchart of a computer-implemented database management method according to an embodiment.

This will be explained in further detail with the aid of FIG. 2 and FIG. 3. FIG. 2 schematically depicts a columnar database management system 200 implemented by the computer system 100 according to an embodiment and FIG. 3 depicts a flowchart of a columnar database management method that may be implemented by the computer system 100 according to an embodiment. In at least some embodiments, a data storage device 120 may store computer readable program instructions for, when executed on the processor arrangement 110 adapted to execute the computer readable program instructions, cause the processor arrangement 110 to execute one or more embodiments of the computer-implemented method as depicted by the flowchart of FIG. 3 and described in more detail below.

The database management system 200 typically embodies a machine learning algorithm 210, for the above predictive analytics of the forecasted parameters, which may be any suitable machine learning algorithm. Machine learning algorithms are well-known per se, and may include collaborative filtering and other techniques often found in data mining applications, as is familiar to those of ordinary skill in the art. In particular, algorithms suitable for use in a Machine Learning Ranking (MLR) space are particularly suitable. MLR is the application of machine learning, typically supervised, semi-supervised or reinforcement learning, in the construction of ranking models for information retrieval systems. Training data may consist of lists of items with some (partial) order specified between items in each list. This order is typically induced by giving a numerical or ordinal score or a binary judgment (e.g. "relevant" or "not relevant") for each item. The ranking model's purpose is to predictively rank, i.e. produce a permutation of items in new, unseen lists in a way which is derived (learnt) from rankings in the training data. MLR is a technique commonly employed in internet search engines for page ranking. Non-limiting examples of MLR algorithms include polynomial regression, staged logistic regression, ordinal regression and regularized least squares.

To this end, the machine learning algorithm 210 may be configured to receive forecasted parameter values from one or more parameter value sources 220. The one or more parameter value sources 220 may include a user providing at least some of the parameter values, e.g. using an input device 112, automated feeds from relevant forecasting services, and so on. The machine learning algorithm 210 further has access to a compression dictionary database 230 including the aforementioned historical information including historical parameter values and historical ranking information for the respective data entries in the set of data entries previously stored in a column partition of the columnar database in a compressed form using the associated compression dictionary. The machine learning algorithm 210 may be implemented by the processor arrangement 110, which may be further configured to receive an expected set of data entries from a data entry source 240, e.g. the one or more data entry generators 10 and to compress the received expected set of data entries in accordance with a predictive compression library generated based on the ranking of the data entries in the expected set of data entries predicted by the machine learning algorithm 210 based on the evaluation of the historical ranking information using the forecasted parameter values received from the one or more parameter value sources 220. The processor arrangement 110 may be further adapted to store the compressed data entries of the received expected set of data entries in the columnar database 250, which may be stored in the one or more data storage devices 120 as previously explained.

At this point, it is noted that although FIG. 2 schematically depicts several entities as separate entities, it should be understood that it is equally feasible that at least of these entities form different parts of a single entity. For example, at least one of the machine learning algorithm 210, the compression dictionary database 230 may form part of the database 250. For instance, the various compression dictionaries in the compression dictionary database 230 may be stored as separate pages in the database 250.

The operation of the column-oriented database management system 200 implemented by the computer system 100 will be explained in more detail with the aid of FIG. 3, which depicts a flowchart of a computer-implemented method 300 for managing the columnar database 250. The method 300 starts in 301, which for example may include initiating a database management program or routine for compressing a new set of data entries to be stored in a column partition of the columnar database 250 before proceeding to 303 in which the machine learning algorithm 210 receives the forecasted parameter values of the set of parameters relevant to the recurrence frequency of the data entries in the expected set of data, i.e. relevant to the recurrence frequency of the data entries to be stored in the empty column partition. The machine learning algorithm 210 may receive forecasted parameter values in any suitable manner as previously explained.

As previously explained, the machine learning algorithm 210 uses the received forecasted parameter values to predict a recurrence frequency of the data entries in the expected set of data entries, e.g. data entries for a next time period to be stored in the columnar database 250 such as next day data entries for example, and to generate a predictive ranking of the expected data entries in terms of their recurrence frequencies by evaluating the historical ranking information and the historical parameter values associated with this historical ranking information in order to identify a match or a resemblance between historical parameter values and the forecasted parameter values. The historical data entry ranking information associated with such matching or resembling historical parameter values may be used by the machine learning algorithm 210 to predict the ranking of the data entries in the expected set of data entries in terms of their respective recurrence frequencies in this expected set of data. As such pattern matching with machine learning algorithms is well-known per se, this will not be explained in further detail for the sake of brevity only.

The predicted ranking of the expected data entries may be used to generate a predictive compression dictionary in 305. Any suitable algorithm for building such a compression dictionary based on ranking information may be employed. Approximate Huffman encoding is a non-limiting example of such a ranking-based compression technique, but many other compression techniques will be immediately apparent to the person skilled in the art and may be equally employed. As previously explained such ranking-based compression algorithms may assign the smallest number of bits to the data entries having the highest recurring frequencies in order to maximize the compression ratio of the compressed set of data, although other compression strategies may also be contemplated.

In 307, the column-oriented database management system 200 receives the expected set of data entries to be compressed and stored into the empty partition of the relevant database column. The expected set of data entries may be received in any suitable manner, e.g. from one or more data entry generators 10 as previously explained. It is noted that although 307 as shown to follow 305, this is by way of non-limiting example only as the method 300 may include 305 and 307 in any suitable order.

In 309, a fraction of the received expected data entries is compressed in accordance with the generated predictive compression dictionary in order to facilitate evaluation of the compression ratio achieved with the predictive compression dictionary, as this is an indication of the accuracy of the predictive ranking of these data entries generated by the machine learning algorithm 210. As will be readily understood, where this ranking is inaccurate, frequently recurring data entries may be represented in the predictive compression dictionary by a relatively large number of bits, leading to suboptimal compression ratios of the received set of data entries. The fraction of the received expected data entries compressed in this manner preferably is kept small enough to limit the overhead of the compression process but should be large enough to provide a relevant statistical representation of the entire received set of data entries, i.e. should provide an accurate reflection of the respective recurrence frequencies of the data entries in the full set of received data entries. For example, the fraction may provide a minority of the full set of received data entries, e.g. 5% or 10% of the full set of received data entries.

In 311, the compression ratio of the compressed fraction of the received expected data entries is calculated. This may be simply expressed as a ratio of the total size of the compressed fraction divided by the total size of the uncompressed fraction, or any suitable alternative expression. The calculated compression ratio is subsequently compared in 313 with a target value to determine if the difference between the calculated compression ratio of the compressed fraction and the target value of this compression ratio lies within a defined range, e.g. within an acceptable standard deviation. In an embodiment, the target value may be based on historical compression ratios achieved with the historical compression dictionaries used for compressing previous data entry sets received with the column-oriented database management system 200. The target value for example may be a global compression ratio for the relevant column of the columnar database 250, which may be an averaged compression ratio for the respective partitions of the relevant column.

If it is decided in 313 that the achieved compression ratio using the predictive compression dictionary deviates from the target value of the compression ratio by less than a defined amount, i.e. lies within a defined range, the method 300 may proceed to 319 in which the remaining received data entries are compressed using the predictive compression dictionary and subsequently stored in the appropriate column partition of the columnar database 250 in 321. During storage of the compressed received data entries in this partition, the database table to which the relevant column belongs may be locked, i.e. no other changes may be made to this table during the writing process in order to avoid accidental data corruption. At the same time, the predictive compression dictionary may be stored in the dictionary database 230 together with its relevant metadata, e.g. the data entry ranking of the data entries predicted by the machine learning algorithm 210 and the forecasted parameter values associated with this predicted ranking.

On the other hand, if it is decided in 313 that the achieved compression ratio using the predictive compression dictionary deviates from the target value of the compression ratio by more than a defined amount, i.e. lies outside a defined standard deviation range, the method 300 may proceed to 315 in which the fraction of the received expected data entries is explicitly evaluated to determine the respective recurrence frequencies of the data entries in this fraction and determine the ranking of the respective data entries in this fraction based on the determined respective recurrence frequencies. This ranking information may be used in 317 to build an actual compression dictionary as previously explained, which actual compression dictionary may be stored in the historical compression dictionary database 230 upon which the machine learning algorithm 210 relies when identifying patterns in historical parameter values in order to find historical parameter values that match or resemble the forecasted parameter values received by the machine learning algorithm 210 after which the method 300 returns to 305 such that the machine learning algorithm 210 can factor in the correlations between the forecasted parameter values and the actual ranking information determined in 315 when predicting augmented recurrence frequencies and ranking of the received data entries from which an augmented predictive compression dictionary may be generated.

In this manner, the machine learning algorithm 210 may be iteratively improved until it is determined in 313 that the compression ratio achieved by the (augmented) predictive compression dictionary lies within a standard deviation from the aforementioned target value of this compression ratio, after which the method 300 may compress the remaining received data entries with the predictive compression dictionary in 319 and store the compressed received data entries in the designated column partition in 321 prior to terminating the method 300 in 323. All column partitions to be filled, e.g. partitions of associated columns, may be filled with compressed data compressed in accordance with one or more of the above embodiments.

The present invention may be a (computer) system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of compressing data in a columnar database comprising at least one column partitioned into a plurality of partitions including at least one empty partition and a plurality of filled partitions each comprising data entries associated with a set of parameters having parameter values relevant to a recurrence frequency of the data entry in the partition, the data entries being compressed in accordance with a compression dictionary based on respective recurrence frequencies of the data entries in the filled partition, the computer-implemented method comprising:
    receiving forecasted parameter values for the set of parameters for an expected set of data entries to be stored in an empty partition of the column;
    predicting a recurrence frequency of the data entries in the expected set using the forecasted parameter values by evaluating data entry ranking histories associated with the respective compression dictionaries of the filled partitions with a machine learning algorithm, wherein:
        evaluating the data entry ranking histories associated with the respective compression dictionaries of the filled partitions with the machine learning algorithm comprises detecting a correlation between patterns in the parameter values associated with the respective compression dictionaries and the associated data entry ranking histories;
        predicting the recurrence frequency of the data entries in the expected set further comprises detecting further patterns in the forecasted parameter values and comparing the detected further patterns with the patterns detected in the parameter values associated with the respective compression dictionaries;
    generating a predictive compression dictionary for the expected set of data entries based on the predicted recurrence frequency of the data entries in the expected set;
    receiving the expected set of data entries; and
    compressing at least part of the received expected set of data entries using the predictive compression dictionary.

2. The computer-implemented method of claim 1, in which a parameter value of each parameter associated with a data entry is stored in a separate column of the columnar database.

3. The computer-implemented method of claim 1, further comprising:
    compressing a defined fraction of the received expected set of data entries using the predictive compression dictionary;
    calculating a compression ratio for the compressed defined fraction of the received expected set of data entries;
    comparing the compression ratio with a target value; and, if a difference between the target value and the compression ratio is within a defined range:
    compressing the received expected set of data entries using the predictive compression dictionary; and
    storing the compressed received expected set of data entries in the empty partition.

4. The computer-implemented method of claim 3, further comprising, if a difference between the target value and the compression ratio is outside the defined range:
    determining respective recurrence frequencies of the data entries in the defined fraction of the received expected set;
    generating an actual compression dictionary for the defined fraction of the received expected set based on the determined respective recurrence frequencies of the data entries in the defined fraction of the received expected set;
    augmenting the predictive compression dictionary for the expected set of data entries based on an evaluation of the actual compression dictionary;
    compressing the defined fraction of the received expected set of data entries using the augmented predictive compression dictionary;
    calculating a further compression ratio for the defined fraction of the received expected set of data entries compressed using the augmented predictive compression dictionary;
    comparing the further compression ratio with the target value; and, if a difference between the target value and the further compression ratio is within the defined range:
    compressing the received expected set of data entries using the augmented predictive compression dictionary; and
    storing the compressed received expected set of data entries in the empty partition.

5. The computer-implemented method of claim 3, further comprising locking the columnar database during storing the compressed received expected set of data entries in the empty partition.

6. The computer-implemented method of claim 1, in which the set of parameters includes at least one of meteorological parameters, economic parameters and temporal parameters.

7. A computer program product comprising a computer readable storage medium having computer readable program instructions embodied therewith for, when executed on a computer system for managing a columnar database comprising at least one column partitioned into a plurality of partitions including at least one empty partition and a plurality of filled partitions each comprising data entries associated with a set of parameters having parameter values relevant to a recurrence frequency of the data entry in the partition, the data entries being compressed in accordance with a compression dictionary based on respective recurrence frequencies of the data entries in the filled partition and comprising a processor arrangement adapted to execute the computer readable program instructions, cause the processor arrangement to:

receive forecasted parameter values for the set of parameters for an expected set of data entries to be stored in an empty partition of the column;

predict a recurrence frequency of the data entries in the expected set using the forecasted parameter values by evaluating data entry ranking histories associated with the respective compression dictionaries of the filled partitions with a machine learning algorithm, wherein:

evaluating the data entry ranking histories associated with the respective compression dictionaries of the filled partitions with the machine learning algorithm comprises detecting a correlation between patterns in the parameter values associated with the respective compression dictionaries and the associated data entry ranking histories;

predicting the recurrence frequency of the data entries in the expected set further comprises detecting further patterns in the forecasted parameter values and comparing the detected further patterns with the patterns detected in the parameter values associated with the respective compression dictionaries;

generate a predictive compression dictionary for the expected set of data entries based on the predicted recurrence frequency of the data entries in the expected set;

receive the expected set of data entries; and compress at least part of the received expected set of data entries using the predictive compression dictionary.

8. The computer program product of claim 7, in which the computer readable program instructions further cause the processor arrangement to:

compress a defined fraction of the received expected set of data entries using the predictive compression dictionary;

calculate a compression ratio for the compressed defined fraction of the received expected set of data entries;

compare the compression ratio with a target value; and, if a difference between the target value and the compression ratio is within a defined range:

compress the received expected set of data entries using the predictive compression dictionary; and store the compressed received expected set of data entries in the empty partition.

9. The computer program product of claim 8, in which the computer readable program instructions further cause the processor arrangement to, if a difference between the target value and the compression ratio is outside the defined range:

determine respective recurrence frequencies of the data entries in the defined fraction of the received expected set;

generate an actual compression dictionary for the defined fraction of the received expected set based on the determined respective recurrence frequencies of the data entries in the defined fraction of the received expected set;

augment the predictive compression dictionary for the expected set of data entries based on an evaluation of the actual compression dictionary;

compress the defined fraction of the received expected set of data entries using the augmented predictive compression dictionary;

calculate a further compression ratio for the defined fraction of the received expected set of data entries compressed using the augmented predictive compression dictionary;

compare the further compression ratio with the target value; and, if a difference between the target value and the further compression ratio is within a defined range:

compress the received expected set of data entries using the augmented predictive compression dictionary; and store the compressed received expected set of data entries in the empty partition.

10. The computer program product of claim 8, in which the computer readable program instructions further cause the processor arrangement to lock the columnar database during storing the compressed received expected set of data entries in the empty partition.

11. A computer system comprising a processor arrangement for managing a columnar database comprising at least one column partitioned into a plurality of partitions including at least one empty partition and a plurality of filled partitions each comprising data entries associated with a set of parameters having parameter values relevant to a recurrence frequency of the data entry in the partition, the data entries being compressed in accordance with a compression dictionary based on respective recurrence frequencies of the data entries in the filled partition, the processor arrangement being adapted to:

receive forecasted parameter values for the set of parameters for an expected set of data entries to be stored in an empty partition of the column;

predict a recurrence frequency of the data entries in the expected set using the forecasted parameter values by evaluating data entry ranking histories associated with the respective compression dictionaries of the filled partitions with a machine learning algorithm, wherein:

evaluating the data entry ranking histories associated with the respective compression dictionaries of the filled partitions with the machine learning algorithm comprises detecting a correlation between patterns in the parameter values associated with the respective compression dictionaries and the associated data entry ranking histories;

predicting the recurrence frequency of the data entries in the expected set further comprises detecting further patterns in the forecasted parameter values and comparing the detected further patterns with the patterns detected in the parameter values associated with the respective compression dictionaries;

generate a predictive compression dictionary for the expected set of data entries based on the predicted recurrence frequency of the data entries in the expected set;

receive the expected set of data entries; and compress at least part of the received expected set of data entries using the predictive compression dictionary.

12. The computer system of claim 11, in which the processor arrangement is further adapted to:

compress a defined fraction of the received expected set of data entries using the predictive compression dictionary;

calculate a compression ratio for the compressed defined fraction of the received expected set of data entries;

compare the compression ratio with a target value; and, if a difference between the target value and the compression ratio is within a defined range:
   compress the received expected set of data entries using the predictive compression dictionary; and
   store the compressed received expected set of data entries in the empty partition.

13. The computer system of claim 12, in which the processor arrangement is further adapted to, if a difference between the target value and the compression ratio is outside a defined range:
   determine respective recurrence frequencies of the data entries in the defined fraction of the received expected set;
   generate an actual compression dictionary for the defined fraction of the received expected set based on the determined respective recurrence frequencies of the data entries in the defined fraction of the received expected set;
   augment the predictive compression dictionary for the expected set of data entries based on an evaluation of the actual compression dictionary;
   compress the defined fraction of the received expected set of data entries using the augmented predictive compression dictionary;
   calculate a further compression ratio for the defined fraction of the received expected set of data entries compressed using the augmented predictive compression dictionary;
   compare the further compression ratio with the target value; and, if a difference between the target value and the further compression ratio is within a defined range:
      compress the received expected set of data entries using the augmented predictive compression dictionary; and
      store the compressed received expected set of data entries in the empty partition.

14. The computer system of claim 11, in which the processor arrangement is further adapted to lock the columnar database during storing the compressed received expected set of data entries in the empty partition.

15. The computer system of claim 11, further comprising a data storage device communicatively coupled to the processor arrangement, the data storage device storing the columnar database.

* * * * *